(12) United States Patent
Chen et al.

(10) Patent No.: US 7,515,877 B2
(45) Date of Patent: Apr. 7, 2009

(54) COMMUNICATING SIGNALS ACCORDING TO A QUALITY INDICATOR AND A TIME BOUNDARY INDICATOR

(75) Inventors: Phil F. Chen, Denville, NJ (US); Yingxue Li, Bethlehem, PA (US)

(73) Assignee: Magnolia Broadband Inc., Bedminster, NJ (US)

( * ) Notice: Subject to any disclaimer, the term of this patent is extended or adjusted under 35 U.S.C. 154(b) by 328 days.

(21) Appl. No.: 10/983,292

(22) Filed: Nov. 4, 2004

(65) Prior Publication Data

US 2006/0094418 A1    May 4, 2006

(51) Int. Cl.
H04B 1/00 (2006.01)
H04B 15/00 (2006.01)
H04B 17/00 (2006.01)
H04B 7/00 (2006.01)
H04B 3/46 (2006.01)
H04Q 7/00 (2006.01)
H04Q 1/20 (2006.01)

(52) U.S. Cl. .................. 455/69; 455/63.1; 455/67.13; 370/332; 375/224

(58) Field of Classification Search .................. 455/423, 455/522, 63.1, 67.11, 67.13, 553.1, 69; 370/318, 370/332, 333, 334; 375/224
See application file for complete search history.

(56) References Cited

U.S. PATENT DOCUMENTS

| | | | |
|---|---|---|---|
| 5,642,353 A | | 6/1997 | Roy, III et al. |
| 5,752,166 A | * | 5/1998 | Dorenbosch et al. ...... 455/67.11 |
| 5,832,044 A | | 11/1998 | Sousa et al. |
| 5,991,330 A | | 11/1999 | Dahlman et al. |
| 5,999,826 A | | 12/1999 | Whinnett |
| 6,185,440 B1 | | 2/2001 | Barratt et al. |

(Continued)

FOREIGN PATENT DOCUMENTS

EP        0 986 193        3/2000

(Continued)

OTHER PUBLICATIONS

PCT, Invitation to Pay Additional Fees, Annex to Form PCT/ISA/206 Communication Relating to the Results of the Partial International Search dated Feb. 9, 2006 for International Application No. PCT/US2005/036545, 8 pages.

(Continued)

*Primary Examiner*—Nay A Maung
*Assistant Examiner*—Andrew Wendell
(74) *Attorney, Agent, or Firm*—Pearl Cohen Zedek Latzer, LLP (57) ABSTRACT

One or more quality indicators are established at a first communication device having antenna elements. The quality indicators indicate a quality of one or more communication links between the first communication device and one or more second communication devices. A modification is determined according to the quality indicators, where the modification describes at least one adjustment of one or more modulation features. A time boundary indicator indicating a boundary of a time period is received. At least some of a set of signals are modulated in accordance with the modification and in response to the time boundary indicator, where a signal is associated with an antenna element. The set of signals is sent from the antenna elements to yield a transmitted signal.

12 Claims, 7 Drawing Sheets

U.S. PATENT DOCUMENTS

| | | | |
|---|---|---|---|
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,539,088 | B1 | 3/2003 | Ahn et al. .............. 370/342 |
| 6,636,495 | B1 | 10/2003 | Tangemann |
| 6,704,370 | B1 | 3/2004 | Chheda et al. |
| 6,745,009 | B2 | 6/2004 | Raghothaman |
| 6,757,537 | B1 | 6/2004 | Choi et al. .............. 455/438 |
| 6,810,264 | B1 | 10/2004 | Park et al. |
| 6,834,197 | B2 * | 12/2004 | Nakahara et al. .......... 455/522 |
| 6,859,643 | B1 | 2/2005 | Ma et al. |
| 6,882,228 | B2 | 4/2005 | Rofougaran |
| 7,058,425 | B1 * | 6/2006 | Takakusaki .............. 455/561 |
| 7,062,232 | B2 * | 6/2006 | Coan et al. .............. 455/101 |
| 7,069,034 | B1 * | 6/2006 | Sourour .................. 455/522 |
| 7,110,793 | B1 * | 9/2006 | Ishida .................. 455/562.1 |
| 2002/0105929 | A1 | 8/2002 | Chen et al. .............. 370/335 |
| 2002/0126650 | A1 | 9/2002 | Hall et al. .............. 370/349 |
| 2003/0112880 | A1 | 6/2003 | Walton et al. |
| 2003/0114179 | A1 * | 6/2003 | Smolyar et al. .......... 455/522 |
| 2004/0005905 | A1 * | 1/2004 | Petrus et al. ............ 455/522 |
| 2004/0029533 | A1 * | 2/2004 | Matsuo et al. ........... 455/63.1 |
| 2004/0048584 | A1 | 3/2004 | Vaidyanathan et al. |
| 2004/0062225 | A1 * | 4/2004 | Ling et al. .............. 370/338 |
| 2004/0085239 | A1 | 5/2004 | Ukena et al. |
| 2004/0137948 | A1 * | 7/2004 | Benning et al. ........ 455/562.1 |
| 2004/0171352 | A1 * | 9/2004 | Maeda et al. .......... 455/67.13 |
| 2004/0203727 | A1 * | 10/2004 | Abiri et al. .............. 455/423 |
| 2005/0026566 | A1 * | 2/2005 | Dabak et al. .......... 455/67.11 |
| 2005/0041622 | A1 * | 2/2005 | Dubuc et al. ............ 370/332 |
| 2005/0059355 | A1 | 3/2005 | Liu |
| 2005/0143113 | A1 | 6/2005 | Lee et al. |
| 2005/0181832 | A1 * | 8/2005 | Ishii et al. ............. 455/562.1 |
| 2005/0288053 | A1 * | 12/2005 | Gu ....................... 455/522 |
| 2006/0084388 | A1 * | 4/2006 | Li et al. ................. 455/67.11 |

FOREIGN PATENT DOCUMENTS

| | | |
|---|---|---|
| EP | 1 255 369 A1 | 11/2002 |
| EP | 1 282 242 | 2/2003 |
| EP | 1 282 244 | 2/2003 |
| EP | 1 284 545 | 2/2003 |
| EP | 1 309 121 A1 | 5/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

PCT, Notification of Transmittal of the International Search Report and the Written Opinion of the International Searching Authority, or the Declaration, PCT/US2005/039164, 11 pages, mailed Feb. 15, 2006.

"*Physical Layer Standard for cdma2000 Spread Spectrum Systems*", Release C, 3G, 3$^{rd}$ Generation Partnership Project 2 "3GPP2", 3GPP2 C.S0002-C, Version 1.0, 509 pages, May 28, 2002.

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

* cited by examiner

COMMUNICATING SIGNALS ACCORDING TO A QUALITY INDICATOR AND A TIME BOUNDARY INDICATOR

TECHNICAL FIELD

This invention relates generally to the field of wireless communications and more specifically to communicating signals according to a quality indicator and a time boundary indicator.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for communicating signals using multiple antenna elements may be reduced or eliminated.

According to one embodiment of the present invention, one or more quality indicators are established at a first communication device having antenna elements. The quality indicators indicate a quality of one or more communication links between the first communication device and one or more second communication devices. A modification is determined according to the quality indicators, where the modification describes at least one adjustment of one or more modulation features. A time boundary indicator indicating a boundary of a time period is received. At least some of a set of signals are modulated in accordance with the modification and in response to the time boundary indicator, where a signal is associated with an antenna element. The set of signals is sent from the antenna elements to yield a transmitted signal.

Certain embodiments of the invention may provide one or more technical advantages. A technical advantage of one embodiment may be that a modification may be determined according to a quality indicator. The modification may be applied to signals transmitted by multiple antenna elements in response to a time boundary indicator, which may improve the quality of the transmitted signals.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 14 of the drawings, like numerals being used for like and corresponding parts of the various drawings.

Figure 1:
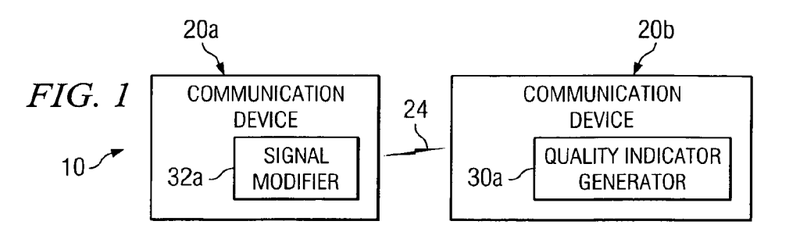
FIG. 1 is a block diagram of one embodiment of a communication network that includes one or more transmitting communication devices and one or more receiving communication devices that communicate via a wireless link.

FIG. 1 is a block diagram of one embodiment of a communication network 10 that includes one or more transmitting communication devices 20a and one or more receiving communication devices 20b that communicate via a wireless link 24. According to the embodiment, a communication device 20a receives a quality indicator such as a power control bit describing the quality of wireless link 24, and determines a modification according to the quality indicator. Communication device 20a modulates signals for transmission to communication device 20b using the modification in accordance with a time boundary. In certain cases, modulating the signals in accordance with a time boundary may synchronize modification of the signal with a quality indicator describing the link quality in response to the modification.

According to the illustrated embodiment, a communication device 20a-b comprises any device operable to communicate information via signals to one or more other communication devices. For example, communication device 20a-b may comprise a subscriber communication device or a base station. A subscriber communication device may comprise any device operable to communicate with a communication system, for example, a personal digital assistant, a cellular telephone, a mobile handset, or any other device suitable for communicating data to and from a base station. A subscriber communication device may support, for example, simple Internet Protocol (IP), mobile IP, or any other suitable communication protocol. A subscriber communication device may utilize, for example, General Packet Radio Service (GPRS) technology or any other suitable mobile communication technology.

A base station typically includes a base transceiver station and a base station controller. The base transceiver station typically communicates signals to and from one or more subscriber communication devices. The base station controller manages the operation of the base transceiver station. The base station provides a subscriber communication device access to a communication network that allows the subscriber communication device to communicate with other networks or devices. A communication network may comprise all or a portion of public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Transmitting communication device 20a, receiving communication device 20b, or both may include one or multiple antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

Communication devices 20a-b may communicate with one or more subscriber communication devices, one or more base stations, one or more other communication devices, or any combination of the preceding. Communication devices 20a-b may communicate according to any suitable communication protocol. For example, communication devices 20a-b may communicate according to any suitable code division multiple access (CDMA) protocol such as CDMA-IS-95 AIB, CDMA 2000 1XRTT, CDMA 2000 3X, CDMA EV-DO, wideband CDMA (WCDMA), CDMA EV-DV, or other suitable CDMA protocol. Examples of other protocols include any generation Universal Mobile Telecommunications System, hybrid multiple access protocols, 802.xx protocols, time division multiple access (TDMA) protocols, and frequency division multiple access (FDMA) protocols.

A communication link between communication devices 20a and 20b such as wireless link 24 is typically a radio frequency link that may be cellular in network organization. Wireless link 24 may be used to communicate a signal between communication devices 20a and 20b. A signal may comprise data packets communicating information such as data, video, voice, multimedia, any other suitable type of information, or any combination of the preceding. Wireless link 24 may be configured according to a Multiple-Input-Multiple-Output (MIMO) communications protocol.

According to the illustrated embodiment, communication device 20b generates one or more quality indication signals from which communication device 20a determines the modification. Communication device 20b includes a quality indicator generator 30a that generates one or more quality indicators that reflect the quality of wireless link 24. The quality of a communication link may be determined from the characteristics of a signal received from communication device 20a, for example, the signal-to-noise-ratio, signal-to-interference-ratio, signal power, signal timing stability, signal envelop, other suitable signal characteristic, or any combination of the preceding. A quality indicator may reflect changes in the quality due to a modification applied by communication device 20a.

A quality indicator reflecting quality may comprise, for example, a power control bit, bit error rate indicator, frame error rate indicator, packet error rate indicator, other suitable quality indicator, or any combination of the preceding. As an example, a power control bit instructs a communication device 20a-b to increase or decrease transmission power. Quality indicator generator 30a may transmit the quality indicator via a quality indication signal. A quality indication signal may comprise a signal having information about the quality of the communication link, for example, a power control signal of any suitable CDMA protocol, error rate messages, other suitable quality indication signal, or any combination of the preceding. As an example, a power control signal may include one or more power control bits. A quality indication signal may be transmitted at any suitable rate, for example, once every 1.25 ms for cdmaOne (IS-95)/CDMA2000 or once every 0.66 ms for WCDMA.

Communication device 20a includes a signal modifier 32a that modifies a pre-transmission signal in accordance with one or more quality indicators of a received quality indication signal. The signals may be modified to increase constructive interference or reduce destructive interference. A modification may refer to one or more adjustments of one or more modulation features of one or more signals. A modulation feature refers to a feature of a signal that may be modulated, for example, a phase, amplitude, frequency, timing, other suitable modulation feature, or any combination of the preceding. A modification may be applied to a signal or to frequency subbands of a signal. As an example, a set of one or more adjustments may be applied to a signal. As another example, multiple sets of one or more adjustments may be applied to a signal, where each set is applied to a different subband of the signal.

Signal modifier 32a determines a modification in accordance with the one or more quality indicators. For example, signal modifier 32a may calculate a complex weighting based on the quality indicators, which may be used to adjust the magnitude and phase of the signal. The complex weighting provided may be based on one or more modification features such as the total power of the transmitted signal, the phase rotation associated with each antenna element, the power ratio associated with each antenna element, the time delay associated with each antenna element, other feature, or any combination of the preceding.

Signal modifier 32a modifies a signal by applying the determined modification to produce one or more modified pre-transmission signals. The number of pre-transmission signals may correspond to the number of antenna elements of a transmit antenna of communication device 20a, and a pre-transmission signal may be associated with an antenna element. The number of pre-transmission signals may, however, be less than, equal to, or greater than the number of antenna elements. Signal modifier 32a may modify a signal in any suitable manner. For example, signal modifier 32a may manipulate the weights of the various power amplifiers that feed their respective antenna elements of the transmit antenna.

Signal modifier 32a applies the modification in response to a time boundary indicator. A time boundary indicator indicates the time boundary of a time period such as a CDMA power control group (PCG). According to CDMA, traffic channels are subdivided into 20-ms frames. Each frame is further subdivided into 16 power control groups, each lasting 1.25 ms. In general, a power control bit is sent for each power control group. In practice, a power control bit may be sent at any of a number of times within a power control group. Signal modifier 32a may apply a modification in response to a time boundary indicator in order to apply one modification per time period. The modification may be applied at any suitable point of the time period. Applying one modification per time period may synchronize modification of the signal with a quality indicator describing the link quality in response to the modification. Synchronization may avoid a quality indicator describing the link quality in response to less than one or more than one modification.

Communication device 20a transmits the modified pre-transmission signals that form a combined signal, which may be received by communication device 20b or other suitable communication device 20a-b. The modification of the pre-transmission signals may provide for improved communication of the signals. For example, if the rate at which the signals are controlled exceeds the rate of fading, then the signal may be received at a relatively constant rate of power at a substantially optimized power. Other aspects of the communication may be optimized or improved, for example, reduced medium contention, reduced probability of detection or interception, improved network load balance, reduced RF interference, other aspect, or any combination of the preceding.

Alterations or permutations such as modifications, additions, or omissions may be made to communication network 10 without departing from the scope of the invention. Additionally, operations of communication network 10 may be performed using any suitable logic comprising software, hardware, other logic, or any suitable combination of the preceding. As used in this document, "each" refers to each member of a set or each member of a subset of a set.

Figure 2:
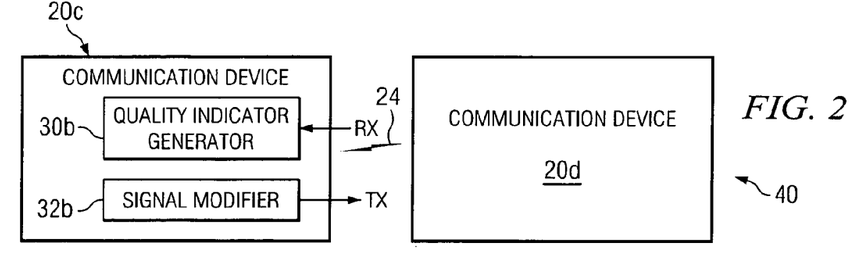
FIG. 2 is a block diagram of another embodiment of a communication network that includes one or more transmitting communication devices and one or more receiving communication devices that communicate via a wireless link.

FIG. 2 is a block diagram of another embodiment of a communication network 40 that includes one or more transmitting communication devices 20c and one or more receiving communication devices 20d that communicate via a wireless link 24. A communication device 20c calculates a quality indicator describing the quality of wireless link 24, and determines a modification according to the quality indicator. Communication device 20c modulates signals for transmission to communication device 20d using the modification in accordance with a time boundary. In certain cases, modulating the signals in accordance with a time boundary may synchronize modification of the signal with a quality indicator describing the link quality in response to the modification.

According to one embodiment, communication device 20c includes a quality indicator generator 30b and a signal modifier 32b. Quality indicator generator 30b generates one or more quality indicators that reflect the quality of wireless link 24. The quality of a communication link may be determined in any suitable manner. Signal modifier 32b modifies a pre-transmission signal in accordance with one or more quality indicators. Signal modifier 32b may determine a modification in accordance with the quality indicator as described with reference to FIG. 1. Signal modifier 32b may modify a signal by applying the determined modification in response to a time boundary indicator as described with reference to FIG. 1 to produce one or more modified pre-transmission signals.

Alterations or permutations such as modifications, additions, or omissions may be made to communication network 40 without departing from the scope of the invention. Additionally, operations of communication network 40 may be performed using any suitable logic comprising software, hardware, other logic, or any suitable combination of the preceding.

Figure 3:
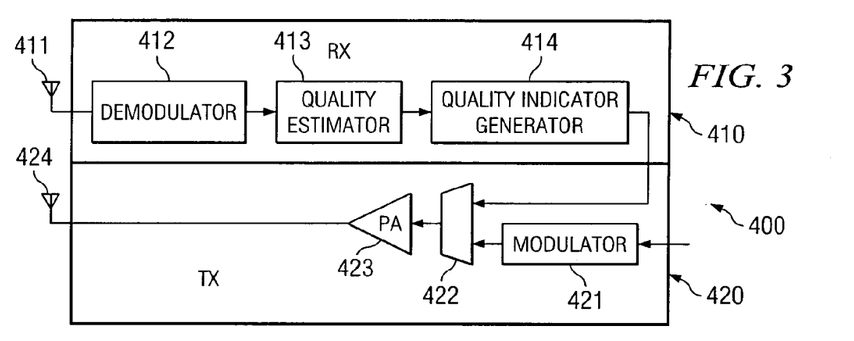
FIG. 3 is a block diagram of one embodiment of a receiving communication device that includes a quality indicator generator that may be used in FIG. 1.

FIG. 3 is a block diagram of one embodiment of a receiving communication device 400 that includes a quality indicator generator 414 that may be used in network 10 of FIG. 1. Communication device 400 includes a receiver (Rx) 410 and a transmitter (Tx) 420 coupled as shown. Receiver 410 includes an antenna 411, a demodulator 412, a quality estimator 413, and a quality indicator generator 414 coupled as shown. Transmitter 420 includes a modulator 421, multiplexer 422, a power amplifier (PA) 423, and an antenna 424 coupled as shown.

Antenna 411 receives signals, which are demodulated by demodulator 412. Quality estimator 413 estimates a quality of the communication link between communication device 400 and another communication device 20a according to the received signal. Quality indicator generator 414 generates a quality indicator that reflects the determined quality. The quality indicator may be provided to the other communication device 20a using a quality indication signal. Modulator 421 modulates a transmit signal, and multiplexer 422 multiplexes the transmit signal and the quality indication signal from quality indicator generator 414. Power amplifier 423 amplifies the transmit signal, and antenna 424 transmits the signal.

Alterations or permutations such as modifications, additions, or omissions may be made to communication device 400 without departing from the scope of the invention. For example, communication device 400 may have more, fewer, or other modules. Moreover, the operations of communication device 400 may be performed by more, fewer, or other modules. Additionally, operations of communication device 400 may be performed using any suitable logic comprising software, hardware, other logic, or any suitable combination of the preceding.

Figure 4:
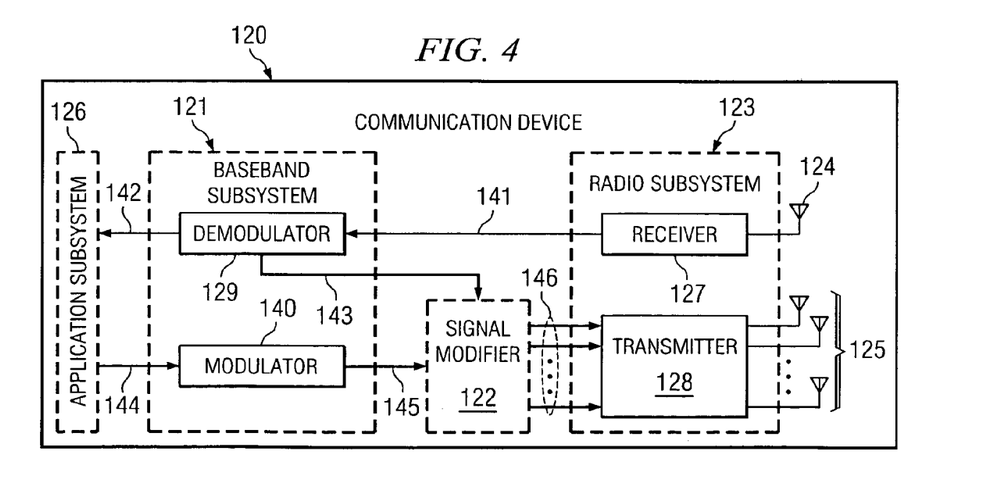
FIG. 4 is a block diagram of one embodiment of a transmitting communication device that includes a signal modifier that may be used in FIG. 1.

FIG. 4 is a block diagram of one embodiment of a transmitting communication device 120 that includes a signal modifier 122 that may be used in network 10 of FIG. 1. Communication device 120 may include an application subsystem 126, a baseband subsystem 121, a signal modifier 122, a radio subsystem 123, a receive antenna 124, and one or more transmit antennas 125 coupled as shown.

Application subsystem 126 processes receive signals to extract information communicated in the receive signals, and processes transmit signals for transmission to communicate information. Baseband subsystem 121 includes a modulator 140 that modulates signals and a demodulator 129 that demodulates signals. Baseband system 121 may generate time boundary indicators, which are provided to signal modifier 122. Signal modifier 122 modulates one or more pre-transmission signals in accordance with one or more quality indicators. Radio subsystem 123 includes a receiver 127 that receives signals from receive antenna 124 and a transmitter 128 that sends signals to one or more transmit antennas 125. Radio subsystem 123 may include a duplexer/diplexer that separates different bands such as cellular service from Personal Communication Service (PCS) bands, receive from transmit bands, or both. Receive antenna 124 receives signals and may have one or more antenna elements, and a transmit antenna 125 transmits signals and may have one or more antenna elements.

According to one embodiment of operation, receiver 127 receives a signal from receive antenna 124. Demodulator 129 demodulates signal 141 to produce a demodulated signal 142 and to extract one or more quality indicators sent from the other side of the wireless link 124. Signal 142 is provided to application subsystem 126. The extracted quality indicators are provided to signal modifier 122 via a quality indication signal 143.

Application subsystem 126 generates an unmodulated transmit signal 144 that may include information and sends signal 144 to modulator 140. Modulator 140 modulates signal 144 to produce a pre-transmission signal 145, which is provided to signal modifier 122. Baseband system 121 may generate time boundary indicators, which are provided to signal modifier 122. Signal modifier 122 modifies pre-transmission signal 145 in accordance with the one or more quality indicators received from demodulator 129 via quality indication signal 143. Signal modifier 122 may include control logic and a vector modulator. The control logic determines a modification in accordance with the one or more quality indicators. For example, quality indication signal modifier 122 may calculate a complex weighting based on the quality indicators. Signal modifier 122 modifies a signal 145 by applying the determined modification in response with a time boundary to produce a set of modified pre-transmission signals 146. Signal modifier 122 may include one or more modifiers that modify a signal or may instruct one or more other modifiers to modify a signal. As an example, a vector modulator of signal modifier 122 may modulate a phase of a signal. As an example, signal modifier 122 may instruct a power amplifier to modify the amplitude of signals.

A modified pre-transmission signal may comprise, for example, a baseband signal, an IF signal, or an RF signal. Modified pre-transmission signal 146 is sent to transmitter 128, which forwards modified pre-transmission signals 146 to transmit antenna 125. Transmit antenna 125 sends a combined signal based on modified pre-transmission signals 146.

Alterations or permutations such as modifications, additions, or omissions may be made to communication device 120 without departing from the scope of the invention. For example, communication device 120 may have more, fewer, or other modules. Moreover, the operations of communication device 120 may be performed by more, fewer, or other modules. Additionally, operations of communication device 120 may be performed using any suitable logic comprising software, hardware, other logic, or any suitable combination of the preceding.

Figure 5:
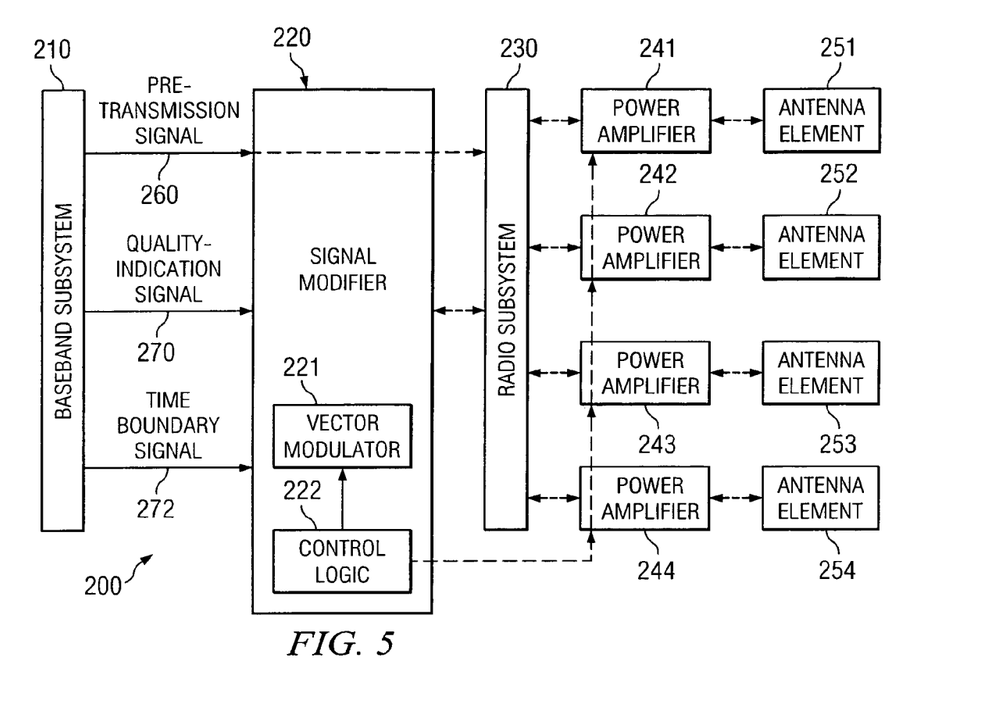
FIG. 5 is a block diagram of one embodiment of a transmitter system that may be used with the communication device of FIG. 2.

FIG. 5 is a block diagram of one embodiment of a transmitter system 200 that may be used with communication device 120 FIG. 4. Transmitter system 200 includes a baseband subsystem 210, a signal modifier 220, a radio subsystem 230, one or more power amplifiers 241, 242, 243, and 244, and one or more antenna elements 251, 252, 253, and 254 coupled as shown.

Baseband subsystem 210 sends a pre-transmission signal 260, a quality indication signal 270, and a time boundary signal 272 to signal modifier 220. Signal modifier 220 includes vector modulator 221 and control logic 222. Control logic 222 determines a modification in accordance with one or more quality indications of quality indication signal 270, and provides instructions for performing the modulation. As an example, control logic 222 may instruct vector modulator 221 to modulate a phase of a signal. As another example, control logic 222 may instruct power amplifiers to modify the amplitude of signals. Control logic 222 provides instructions to apply the modifications in response to time boundary signal 272 that has one or more time boundary indicators. The modifications may be applied such that one modification is applied per time period, for example, per power control group.

Radio subsystem 230 receives the modified pre-transmission signal from signal modifier 220, and converts the received pre-transmission signal into radio frequency (RF) signals, which are provided to power amplifiers 241 through 244. Power amplifiers 241 through 244 each receive an RF modified pre-transmission signal and amplify the signals for transmission. Power amplifiers 241 through 244 provide the amplified signals to antenna elements 251 through 254. Although transmitter system 200 is shown as having four antenna elements 251 through 254 and four corresponding power amplifiers 241 and 244, transmitter system 200 may have any number of antenna elements and any number of power amplifiers. Each antenna element sends its respective RF modified pre-transmission signal to produce a transmitted signal.

Alterations or permutations such as modifications, additions, or omissions may be made to transmitter system 200 without departing from the scope of the invention. For example, transmitter system 200 may have more, fewer, or other modules. Moreover, the operations of transmitter system 200 may be performed by more, fewer, or other modules. Additionally, operations of transmitter system 200 may be performed using any suitable logic comprising software, hardware, other logic, or any suitable combination of the preceding.

Figure 6:
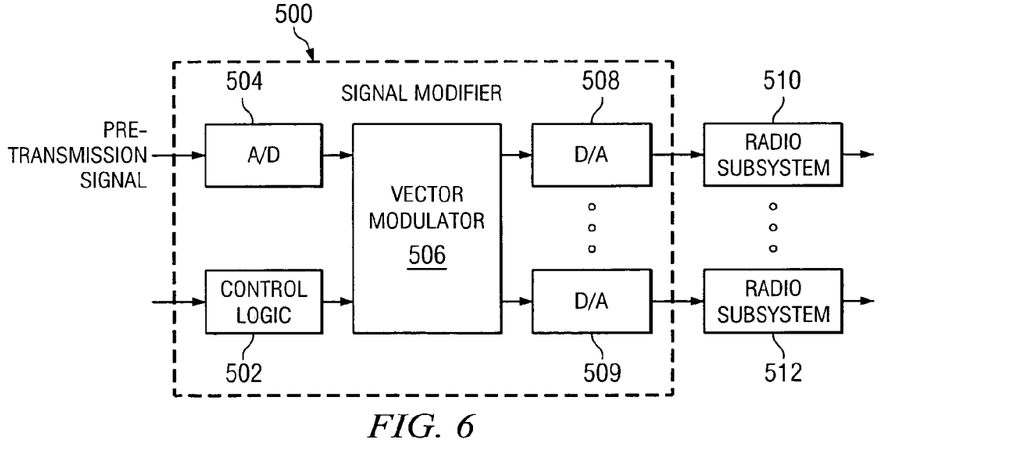
FIG. 6 is a block diagram of one embodiment of a signal modifier.

FIG. 6 is a block diagram of one embodiment of a signal modifier 500 that may be used with any suitable communication device 20 such as communication device 20a-d. Signal modifier 500 includes control logic 502, an analog-to-digital (A/D) converter 504, a vector modulator 506, and one or more digital-to-analog (D/A) converters 508 and 509 coupled as shown. D/A converters 508 and 509 are coupled to one or more radio subsystems 510 and 512 as shown. A D/A converter 508 and a radio subsystem 510 may be associated with an antenna element.

According to the illustrated embodiment, signal modifier 500 receives a pre-transmission signal. A/D converter 504 converts the pre-transmission signal to a digital form and forwards the digital pre-transmission signal to vector modulator 506. Control logic 502 establishes a quality indicator and a time boundary indicator. The quality indicator may be established by extracting the indicator from a quality indication signal or by determining the indicator independent of a quality indication signal. Control logic 502 determines a modification from the quality indicator, and provides instructions to vector modulator 506 for performing the modification. The time boundary indicator may be established from a time boundary signal. Control logic 502 provides instructions to apply the modifications in accordance with the time boundary indicator. Modifications may be applied such that one modification is applied per time period, for example, per power control group.

According to one embodiment, control logic 502 determines a modification from a quality indication signal by calculating a complex weighting. The complex weighting is calculated by determining the appropriate weighting value associated with the in-phase signal component and the quadrature signal component for an antenna element. As an example, if the phase rotation is being adjusted, the weighting value for the in-phase signal component may be different from the weighting value for the quadrature signal component. As another example, if the power ratio is being adjusted, the weighting value for the in-phase signal component and the weighting value for the quadrature signal component may be simultaneously increased or decreased for a given antenna element in parallel. As yet another example, if the total power of the transmitted signal is being adjusted, the weighting value for the in-phase signal component and the weighting value for the quadrature signal component may be simultaneously increased or decreased for all of the antenna elements in parallel.

According to the embodiment, control logic 502 instructs vector modulator 506 to perform the modification by providing the complex weighting values to vector modulator 506. Vector modulator 506 splits the pre-transmission signal into multiple pre-transmission signals. Vector modulator 506 applies the complex weighting to at least a subset of the pre-transmission signals to modify the subset of pre-transmission signals based on the complex weighting values. D/A converters 508 through 509 convert the pre-transmission signals to analog form. Radio subsystems 510 through 512 convert the pre-transmission signals into an RF form. The signals may be forwarded to power amplifiers and respective antenna elements.

Alterations or permutations such as modifications, additions, or omissions may be made to signal modifier 500 without departing from the scope of the invention. For example, signal modifier 500 may have more, fewer, or other modules. Moreover, the operations of signal modifier 500 may be performed by more, fewer, or other modules. Additionally, operations of signal modifier 500 may be performed using any suitable logic comprising software, hardware, other logic, or any suitable combination of the preceding.

Figure 7:
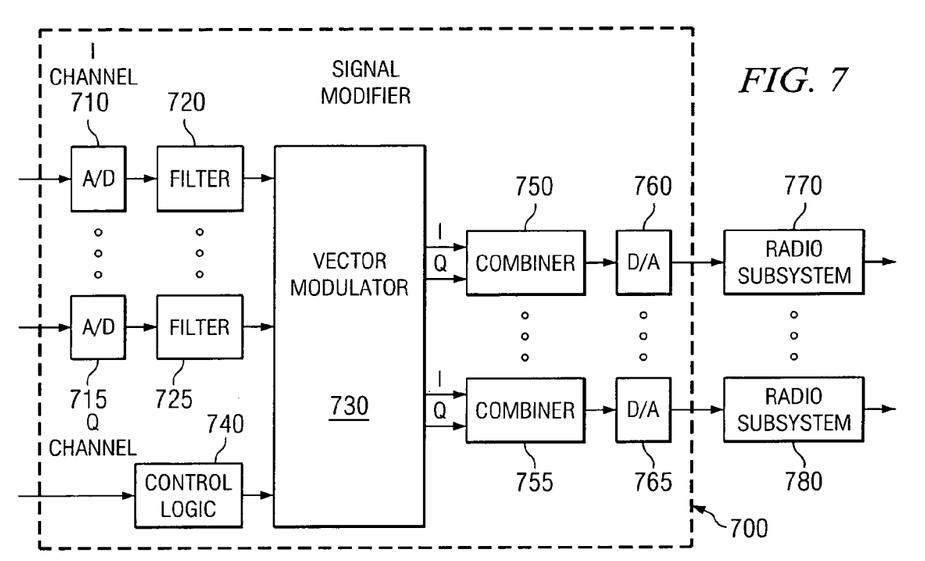
FIG. 7 is a block diagram of another embodiment of a signal modifier.

FIG. 7 is a block diagram of another embodiment of a signal modifier 700 that may be used with any suitable communication device 20 such as communication device 20a-d. Signal modifier 700 includes one or more A/D converters 710 and 715, one or more filters 720 and 725, a vector modulator 730, control logic 740, one or more combiners 750 and 755, and one or more D/A converters 760 and 765 coupled as shown. D/A converters 760 and 765 are coupled to one or more radio subsystems 770 and 780 as shown. A combiner 750 and 755, a D/A converter 760 and 765, and a radio subsystem 770 and 780 may correspond to a given antenna element of an antenna.

According to the illustrated embodiments, A/D converter 710 converts a baseband in-phase signal component to a digital form, and A/D converter 715 converts a baseband quadrature signal component to a digital form. Control logic 740 determines modification instructions from one or more quality indicators and one or more time boundary indicators, and forwards the instructions to vector modulator 730. Vector modulator 730 splits the in-phase and quadrature signal components into a number of signals. Vector modulator 730 modifies the digital signals according to the instructions. For example, vector modulator 730 may apply complex weighting values to the in-phase and quadrature signal components associated for each antenna element. Combiners 750 and 755 combine the in-phase and quadrature signal components of the modified pre-transmission signals. D/A converters 760 and 765 convert the modified pre-transmission signals to analog form and forward the pre-transmission signals to radio subsystems 770 and 780.

Alterations or permutations such as modifications, additions, or omissions may be made to signal modifier 700 without departing from the scope of the invention. Signal modifier 700 may have more, fewer, or other modules. For example, one or more A/D converters 710 or 715, one or more filters 720 and 725 may be omitted such that signal modifier 700 receives digital signals. As another example, combiners 750 and 755 may receive signals from D/A converters 760 and 765 and operate to combine analog signals. Moreover, the operations of signal modifier 700 may be performed by more, fewer, or other modules. Additionally, operations of signal modifier 700 may be performed using any suitable logic comprising software, hardware, other logic, or any suitable combination of the preceding.

Figure 8:
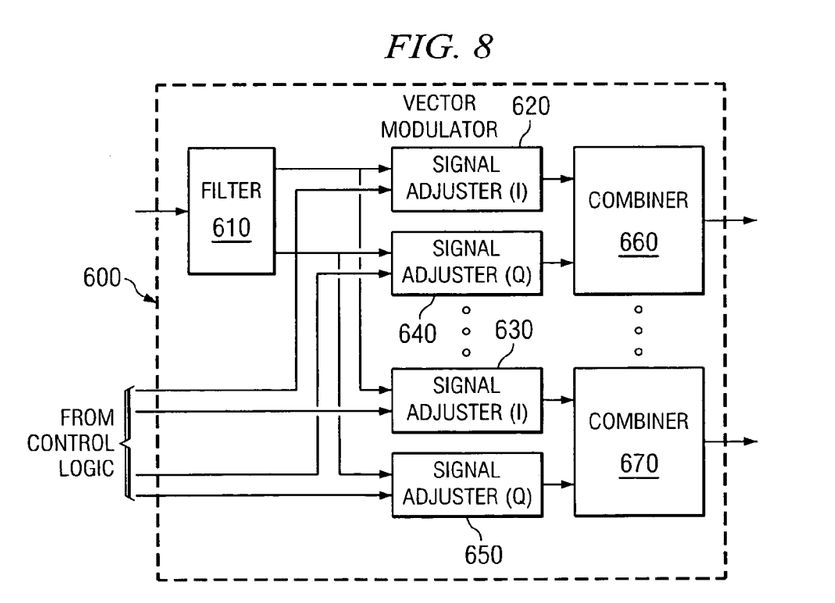
FIG. 8 is a block diagram of one embodiment of a vector modulator.

FIG. 8 is a block diagram of one embodiment of a vector modulator 600 that may be used with any suitable communication device 20 such as communication device 20a-d. Vector modulator 600 includes a filter 610, in-phase signal adjusters 620 through 630, quadrature signal adjusters 640 through 650, and combiners 660 through 670 coupled as shown. An in-phase signal adjuster 620 through 630, a quadrature signal adjuster 640 through 650, and a combiner 660 through 670 may be associated with an antenna element of an antenna.

According to the illustrated embodiment, filter 610 divides pre-transmission signals into in-phase and quadrature components. In-phase signal adjusters 620 through 630 and quadrature signal adjusters 640 through 650 receive complex weighting values from control logic. In-phase signal adjusters 620 through 630 apply the complex weighting to the in-phase component of the pre-transmission signals, and quadrature signal adjusters 640 through 650 apply the complex weighting to the quadrature component of the pre-transmission signals. The application of the complex weighting produces modified pre-transmission signals. Combiners 660 and 670 add the respective modified pre-transmission signals.

Alterations or permutations such as modifications, additions, or omissions may be made to vector modulator 600 without departing from the scope of the invention. Vector modulator 600 may have more, fewer, or other modules. For example, combiners 660 and 670 may be omitted. Moreover, the operations of vector modulator 600 may be performed by more, fewer, or other modules. For example, the operations of filter 610 may be performed by more than one filter, where one filter filters an I channel signal component and another filter filters a Q channel signal component. Additionally, operations of vector modulator 600 may be performed using any suitable logic comprising software, hardware, other logic, or any suitable combination of the preceding.

Figure 9:
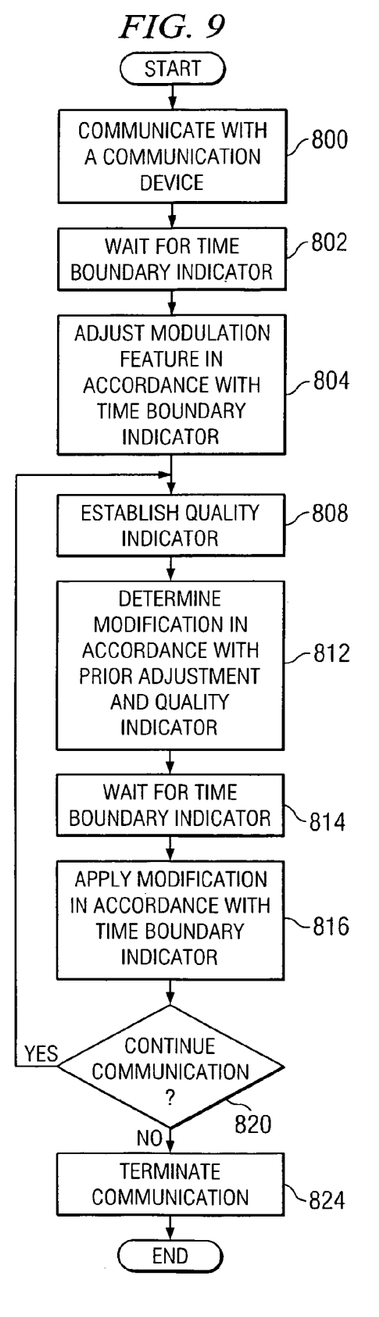
FIG. 9 is a flowchart illustrating one embodiment of a method for applying a modification to a signal in accordance with a time boundary indicator that may be used with any suitable communication device.

FIG. 9 is a flowchart illustrating one embodiment of a method for modifying a signal in accordance to a quality indicator that may be used with any suitable communication device 20 such as communication device 20a-d. The method begins at step 800, where a first communication device 20 communicates with a second communication device 20. First communication device 20 waits for a time boundary indicator at step 802. Modulating a signal in accordance with a time boundary may synchronize modification of the signal with a quality indicator describing the link quality in response to the modification. First communication device 20 adjusts a modulation feature associated with antenna elements of first communication device 20 to modulate a transmitted signal in accordance with the time boundary indicator at step 804. First communication device 20 establishes a quality indicator describing the quality of communication at step 808. For example, first communication device 20 may extract the quality indicator from a quality indication signal sent by second communication device 20 or may calculate the quality indicator independent of any quality indication signal.

First communication device 20 determines a modification according to the adjustment and the quality indicator at step 812. For example, if the quality indicator indicates that the adjustment improved the quality of communication, the modification may operate to enhance the adjustment. If the quality indicator indicates that the adjustment did not improve the quality of communication, the modification may operate to change the adjustment.

First communication device 20 waits for a next time boundary indicator. The modification is applied to modulate a transmitted signal in accordance with the next time boundary indicator at step 816. If communication devices 20 continue to communicate at step 820, the method returns to step 808, where first communication device 20 establishes a quality indicator describing the quality of communication. If communication devices 20 do not continue to communicate at step 820, the method proceeds to step 824, where communication is terminated. After communication is terminated, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Figure 10:
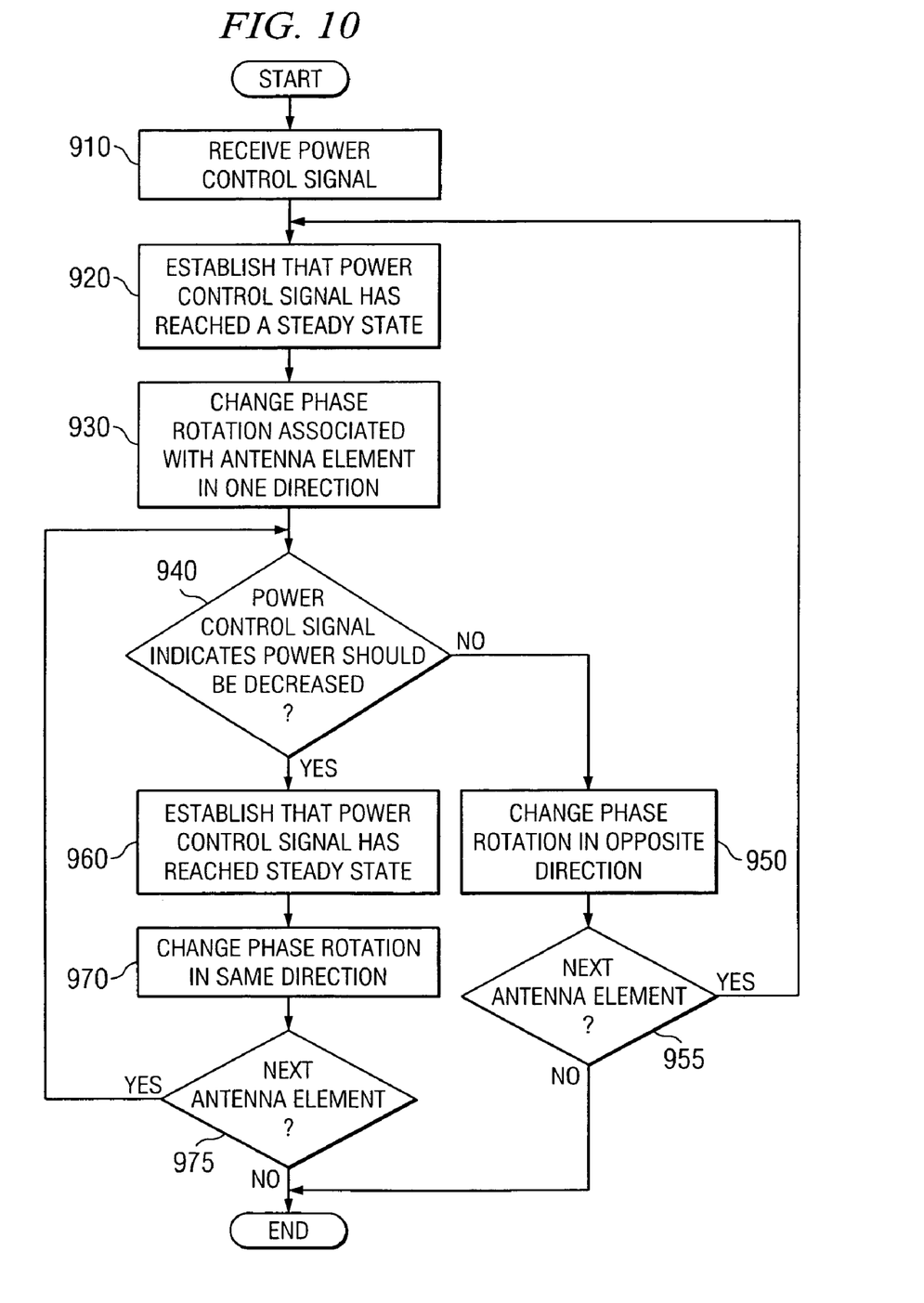
FIG. 10 is a flowchart illustrating an example method for applying a modification to a signal in accordance with a time boundary indicator that may be used with any suitable communication device.

FIG. 10 is a flowchart illustrating an example method for modifying a signal in accordance to a quality indication signal that may be used with any suitable communication device 20 such as communication device 20*a-d*. First communication device 20 receives a power control signal from second communication device 20 at step 910. According to the CDMA protocol, a power control signal indicates either an up value or a down value for a given time period. An up value represents an indication that first communication device 20 should increase the total power of its transmitted signal. A down value represents an indication that first communication device 20 should decrease the total power of its transmitted signal. According to one embodiment, the particular value of a power control signal may be referred to as including a power control bit, which represents either the up or down values in binary form.

Signal modifier 32, for example, signal modifier 32*a-b*, of first communication device 20 establishes that the power control signal has reached a steady state at step 920. The power control signal can reach a steady state in any suitable manner. For example, the power control signal may have a consecutive sequence of values of up-down-up or down-up-down. The phase rotation associated with an antenna element is adjusted in one direction in accordance with a time boundary indicator at step 930. For example, signal modifier 32 may calculate a complex weighting to change the phase rotation and provide the complex weighting to signal adjusters for the antenna element, which adjust the phase rotation according to the complex weighting.

Signal modifier 32 determines whether the power control signal indicates that first communication device 20 should decrease the total power of its transmitted signal at step 940, which may be represented by a down value. If second communication device 20 received the transmitted signal with increased total power, indicating that the communication is being optimized, second communication device 20 sends a down value in a subsequent power control signal. First communication device 20 may continue to attempt to optimize the phase rotation for the antenna element and simultaneously reduce the total power of the transmitted signal.

If the power control signal indicates a decrease for the total power at step 940, then the phase rotation adjustment may have been effective and the method proceeds to step 960. Signal modifier 32 establishes that the power control signal has reached a steady state at step 960. Signal modifier 32 changes the phase rotation associated with that antenna element in the same direction in accordance with a time boundary indicator at step 970. If there is a next antenna element at step 975, the method returns to step 940, where signal modifier 32 repeats the method for the next antenna element. If there is no next antenna element at step 975, the method terminates.

If the power control signal does not indicate a decrease for the total power at step 940, then the phase rotation adjustment may not have been effective and the method proceeds to step 950. Signal modifier 32 changes the phase rotation associated with the antenna element in the opposite direction in accordance with a time boundary indicator at step 950. If there is a next antenna element at step 955, the method returns to step 920, where signal modifier 32 repeats the method for the next antenna element. If there is no next antenna element at step 955, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Figure 11:
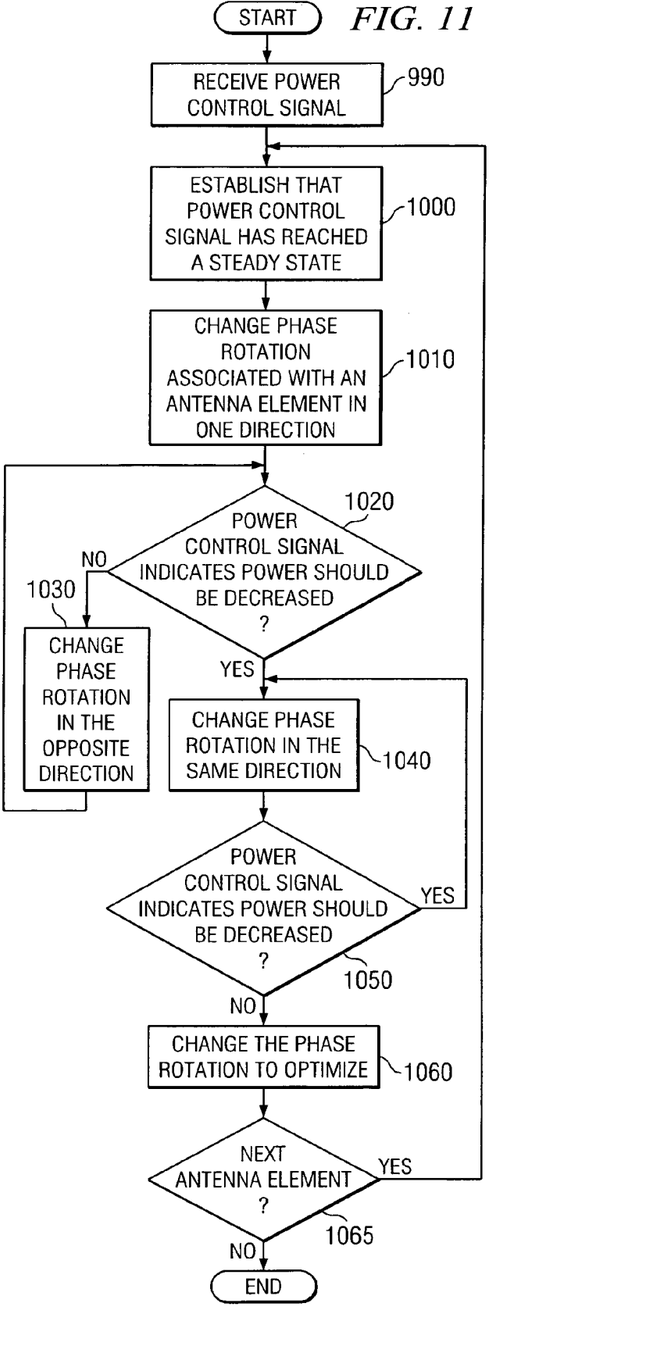
FIG. 11 is a flowchart illustrating another example method for applying a modification to a signal in accordance with a time boundary indicator that may be used with any suitable communication device.

FIG. 11 is a flowchart illustrating another example method for modifying a signal in accordance to a quality indication signal that may be used with any suitable communication device 20 such as communication device 20*a-d*. First communication device 20 receives a power control signal from second communication device 20 at step 990. According to one embodiment, the power control signal may comprise a CDMA power control signal. Signal modifier 32, for example, signal modifier 32*a-b*, of first communication device 20 establishes that the power control signal has reached a steady state at step 1000. The power control signal can reach a steady state in any suitable manner. The phase rotation associated with an antenna element is changed in a one direction in accordance with a time boundary indicator at step 1010.

Signal modifier 32 determines whether the power control signal indicates that first communication device 20 should decrease the total power of its transmitted signal at step 1020, which may be represented by a down value. An instruction to decrease power may indicate that the communication is being optimized. If the power control signal does not indicate a decrease for the total power at step 1020, then the phase rotation adjustment may not have been effective and the method proceeds to step 1030. Signal modifier 32 changes the phase rotation associated with the antenna element in the opposite direction in accordance with a time boundary indicator at step 1030, and the method returns to step 1020.

If the power control signal indicates a decrease for the total power at step 1020, then the phase rotation adjustment may have been effective and the method proceeds to step 1040. Signal modifier 32 changes the phase rotation associated with that antenna element in the same direction in accordance with a time boundary indicator at step 1040. Signal modifier 32 determines whether the power control signal indicates that first communication device 20 should decrease the total power of its transmitted signal at step 1050. If the power control signal indicates a decrease for the total power at step 1050, then the phase rotation adjustment may have been effective and the method returns to step 1040, where signal modifier 32 changes the phase rotation associated with that antenna element in the same direction. If the power control signal does not indicate a decrease for the total power at step 1050, the method proceeds to step 1060. The phase rotation is changed in accordance with a time boundary indicator to optimize communication at step 1060. An optimum phase rotation may be obtained by taking the average of the phase rotations of step 1040. The method then proceeds to step 1065.

If there is a next antenna element at step 1065, the method returns to step 1000, where signal modifier 32 repeats the method for the next antenna element. According to one embodiment, the method may be repeated for each antenna element to obtain an overall optimum for multiple antenna elements. If there is no next antenna element at step 1065, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Figure 12:
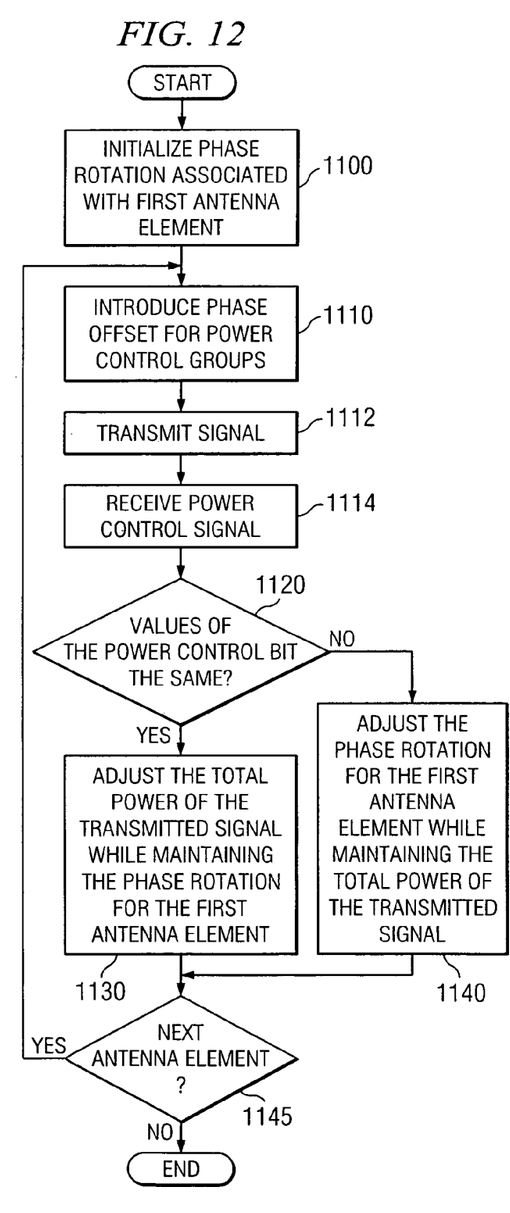
FIG. 12 is a flowchart illustrating an example method for calculating a complex weighting that may be used with any suitable communication device.

FIG. 12 is a flowchart illustrating an example method for calculating the complex weighting that may be used with any suitable communication device 20 such as communication device 20*a*-*d*. According to the embodiment, the complex weighting may be calculated by adjusting the phase rotation associated with each antenna element. Values for the power control bits may be used to determine a phase rotation, and consequently, a complex weighting.

According to the embodiment, first communication device 20 may communicate with second communication device 20 according to a CDMA protocol. First communication device 20 sends a signal of power control groups (PCGs) having at least a first PCG and a second PCG, for example, adjacent PCGs, in such a manner that the power associated with the PCGs are at substantially the same level. Phase rotation Phi represents the phase rotation of the second antenna element relative to the first antenna element in the first PCG. Phase rotation Phi+Delta represents the phase rotation of the second antenna element relative to the first antenna element in the second PCG, where Delta represents a phase rotation offset. The phase rotation offset Delta provides for determining the direction of the phase rotation between the antenna elements that may improve the quality of communication. Second communication device 20 sends a power control signal having power control bits for the PCGs. A power control bit may have a particular value for each time period. For example, the time period for the CDMA and the WCDMA protocols is 1.25 msec and 666 μsec, respectively.

The method begins at step 1100, where a phase rotation associated with the first antenna element is initialized at first communication device 20. A phase rotation offset Delta is introduced for the second PCG relative to the first PCG in accordance with a time boundary indicator at step 1110. The phase rotation offset Delta provides for determining the direction of the phase rotation between the antenna elements that may improve the quality of communication. First communication device 20 transmits a signal based on the introduced phase rotation offset to second communication device 20 at step 1112. Second communication device 20 sends a power control signal based on the received signal. First communication device 20 receives the power control signal at step 1114.

The complex weighting may be calculated from power control bits associated with the PCGs at steps 1120 through 1140. First communication device 20 determines whether values of the power control bit for two time periods, for example, adjacent time periods such as the two most recent time periods, are same at step 1120. If the values for the power control bit are the same, the method proceeds to step 1130. The total power of the transmitted signal is adjusted in accordance with a time boundary indicator while maintaining the phase rotation for the first antenna element, that is, maintaining Phi, at step 1130. The total power may be adjusted while maintaining the phase rotation by appropriately calculating a new complex weighting. The method then proceeds to step 1145.

If the values for the power control bit differ at step 1120, the method proceeds to step 1140. The phase rotation for the antenna elements, that is, Phi, is adjusted in accordance with a time boundary indicator while maintaining total power of the transmitted signal at step 1140. The phase rotation may be adjusted while maintaining the total power by appropriately calculating a new complex weighting. The method then proceeds to step 1145.

If there is a next antenna element at step 1145, the method returns to step 1110, where a phase rotation offset is introduced for the next antenna element. If there is no next antenna element at step 1145, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Figure 13:
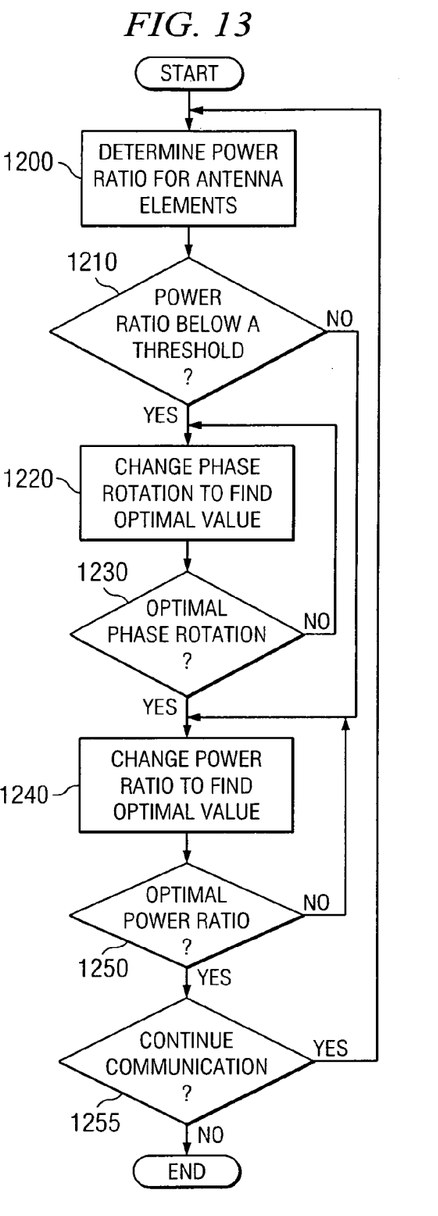
FIG. 13 is a flowchart illustrating another example method for calculating a complex weighting that may be used with any suitable communication device.

FIG. 13 is a flowchart illustrating another example method for calculating a complex weighting that may be used with any suitable communication device 20 such as communication device 20*a*-*d*. According to the embodiment, the complex weighting may be calculated by adjusting the power ratio and the phase rotation associated with each antenna element to optimize a transmitted signal. The power ratio may refer to the ratio between the required transmission power for a weaker antenna element and the required transmission power for a stronger antenna element. An element detection threshold may be considered before adjusting any phase rotation or power ratio for the antenna elements. Based on the threshold values, the phase rotation may be adjusted to converge to a substantially optimal phase rotation value. Having determined the substantially optimal phase rotation value, the power ratio value for the antenna elements may be calculated until a substantially optimal power ratio value is reached. The process is iterative and may be interrupted at any time to change any parameter, such as the phase rotation or the power ratio.

The method begins at step 1200, where the current power ratio for the antenna elements of first communication device 20 is determined. First communication device 20 determines whether the power ratio is below a predetermined threshold or predetermined threshold range at step 1210. For example, the power ratio threshold may be within a range of two to ten, such as between four and eight, such as approximately six. If the power ratio is not below the predetermined threshold at step 1210, then the method proceeds directly to step 1240.

If the power ratio is below the predetermined threshold, then the method proceeds to step 1220 to tune the phase rotation. The phase rotation is changed to find a substantially optimal value at step 1220. First communication device 20 determines whether the phase rotation is substantially optimal at step 1230. If the phase rotation is not substantially optimal, the method returns to step 1220, where the phase rotation is changed in accordance with a time boundary indicator to find a substantially optimal value. If the phase rotation is substantially optimal, then the method proceeds to step 1240.

At step 1240, the power ratio is changed to find an optimal value. The optimal value of a power ratio may optimize the transmission power distribution among the antenna elements. First communication device 20 determines whether the power ratio is substantially optimal at step 1250. If the power ratio is not substantially optimal, the method proceeds to step 1240, where the power ratio is changed in accordance with a time boundary indicator to find an optimal value. If the power ratio is substantially optimal, then the method proceeds to step 1255. If the communication is to continue at step 1255, the method returns to step 1200, where the power ratio for the antenna elements of first communication device 20 is determined. If the communication is to terminate at step 1255, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Figure 14:
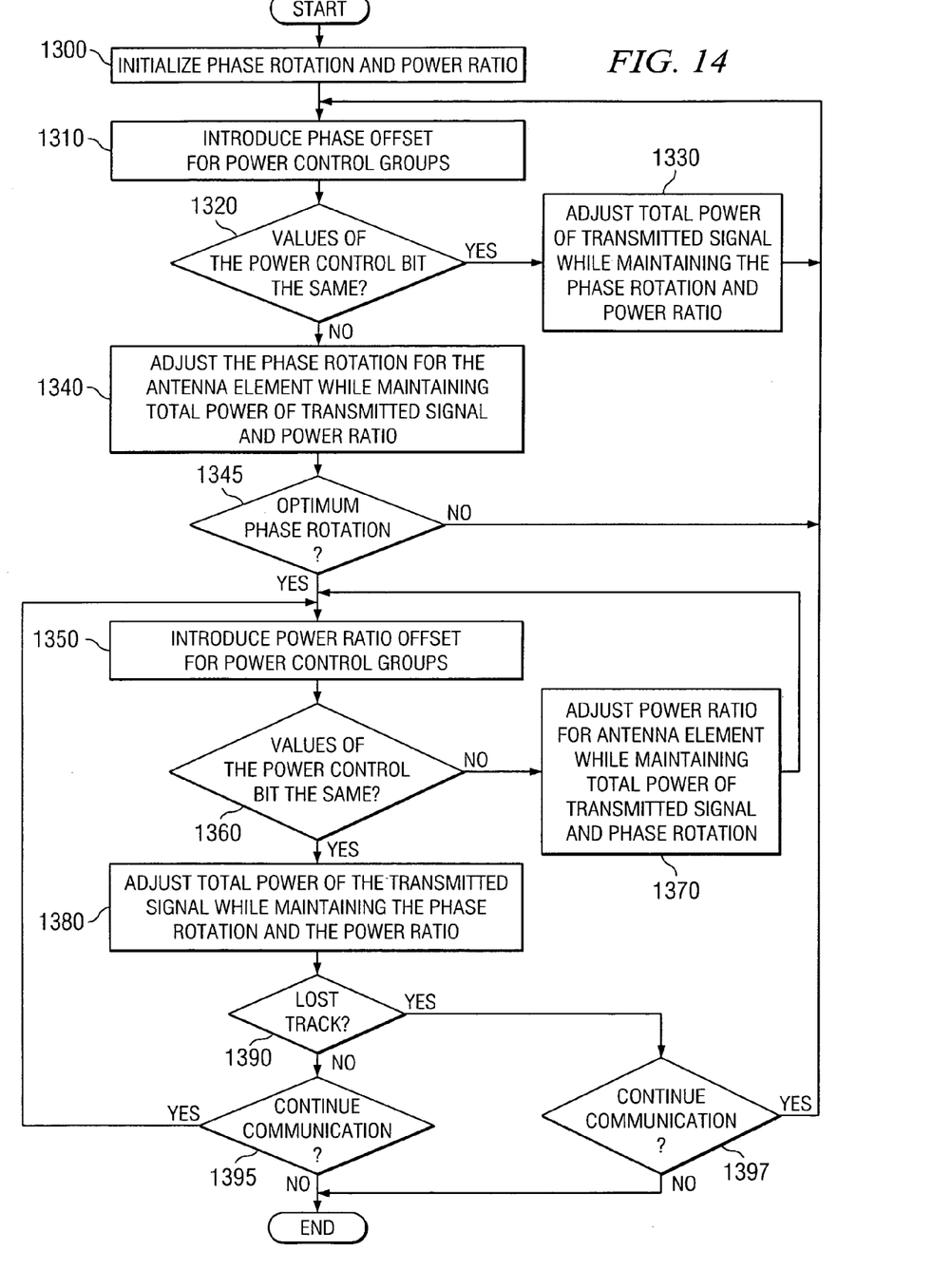
FIG. 14 is a flowchart illustrating another example method for calculating a complex weighting that may be used with any suitable communication device.

FIG. 14 is a flowchart illustrating another example method for calculating a complex weighting that may be used with any suitable communication device 20 such as communication device 20a-d. The complex weighting may be calculated by adjusting the power ratio and the phase rotation associated with each antenna element. Values for the power control bit may be used to determine the proper phase rotation and power ratio. The power ratio associated with the antenna elements may be adjusted after the phase rotation associated with an antenna element is adjusted.

According to the embodiment, first communication device 20 may communicate with second communication device 20 according to a CDMA protocol. First communication device 20 sends a signal of power control groups (PCGs) having at least a first PCG and a second PCG, for example, adjacent PCGs, in such a manner that the power associated with the PCGs are at substantially the same level. Power ratio Lambda represents the power ratio associated with the first PCG between a first antenna element and a second antenna element. Power ratio Lambda+Zeta represents the power ratio associated with the second PCG between the first antenna element and the second antenna element, where Zeta represents the power ratio offset introduced between the first and second PCG. The power ratio offset Zeta may provide a mechanism to determine the direction of changing power ratio between the antenna elements that may improve the quality of communication.

The method begins at step 1300, where a phase rotation and a power ratio associated with a first antenna element of first communication device 20 is initialized. At step 1310, phase rotation offset Delta is introduced for PCGs such as adjacent PCGs in accordance with a time boundary indicator. A signal is transmitted from first communication device 20 to second communication device 20 based on the phase rotation offset. Second communication device 20 sends a power control signal based on the signal from first communication device 20.

First communication device 20 determines whether values such as the most recently received values for the power control bit are same at step 1320. If the values for the power control bits are the same, the method proceeds to step 1330. The total power of the transmitted signal is adjusted in accordance with a time boundary indicator while maintaining the phase rotation for the antenna element at step 1330. The power ratio for the antenna elements may also be maintained. The method then returns to step 1310, where phase rotation offset Delta is introduced for PCGs.

If the values for the power control bits differ, the method proceeds to step 1340. The phase rotation for the antenna elements is adjusted in accordance with a time boundary indicator while maintaining the total power of the transmitted signal at step 1340. The power ratio for the antenna elements may also be maintained. First communication device 20 determines whether the adjusted phase rotation is substantially optimal at step 1345. The optimal value of an phase rotation optimizes the relative phase of the transmitted signal among antenna elements given a fixed power ratio. If the phase rotation is not substantially optimal, then the method returns to step 1310, where phase rotation offset Delta is introduced for PCGs. If the phase rotation is substantially optimal, then the method proceeds to step 1350.

Power ratio offset Zeta is introduced for PCGs such as adjacent PCGs in accordance with a time boundary indicator at step 1350. First communication device 20 determines whether values such as the most recently received values for the power control bit are the same at step 1360. If the values for the power control bit differ, the method proceeds to step 1370. The power ratio for the antenna element is adjusted in accordance with a time boundary indicator while maintaining total power of the transmitted signal and maintaining the phase rotation for the antenna elements at step 1370. The method then proceeds to step 1350.

If the values for the power control bits are the same, the method proceeds to step 1380. The power of the transmitted signal is adjusted in accordance with a time boundary indicator while maintaining the power ratio and the phase rotation for the antenna element at step 1380. First communication device 20 determines whether the track of power control bits is lost at step 1390. If the track is not lost, then the method proceeds to step 1395. If communication is to continue at step 1395, the method returns to step 1350, where power ratio offset Zeta is introduced for PCGs. If communication is to terminate at step 1395, the method terminates.

If the track is lost at step 1390, then the method proceeds to step 1397. If communication is to continue at step 1397, the method returns to step 1310, where phase rotation offset Delta is introduced for PCGs. If communication is to terminate at step 1397, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a modification may be determined according to a quality indicator. The modification may be applied to signals transmitted by multiple antenna elements, which may improve the quality of the transmitted signals.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

To aid the Patent Office and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are used in the particular claim.

What is claimed is:

1. A method for communicating a signal, comprising:
   establishing one or more quality indicators at a first communication device, the first communication device comprising a plurality of antenna elements, the one or more quality indicators indicating a quality of one or more communication links between the first communication device and one or more second communication devices;
   determining a modification according to the one or more quality indicators, the modification describing at least one adjustment of one or more modulation features of a plurality of modulation features, wherein said plurality of modulations features include at least one modulation feature selected from the group consisting of power ratio and phase difference;

receiving a time boundary indicator indicating a boundary of a time period;

modulating at least a first of a plurality of signals relative to a second of said plurality of signals in accordance with the modification and in response to the time boundary indicator, each of the plurality of signals associated with an antenna element of the plurality antenna elements; and sending the plurality of signals from the respective plurality of antenna elements to yield a transmitted signal.

2. The method of claim 1, wherein receiving a time boundary indicator indicating a boundary of a time period further comprises receiving the time boundary indicator from a baseband system.

3. The method of claim 1, wherein receiving a time boundary indicator indicating a boundary of a time period further comprises receiving a time boundary signal comprising the time boundary indicator.

4. The method of claim 1, wherein the time period further comprises a power control group.

5. The method of claim 1, wherein modulating at least a first of a plurality of signals relative to a second of said plurality of signals in accordance with the modification and in response to the time boundary indicator further comprises modulating in accordance with the time boundary indicator to synchronize the modulation of the signal with one or more next quality indicators, the one or more next quality indicators indicating the quality of the one or more communication links in response to the modulation.

6. A system for communicating a signal, comprising:

a first communication device operable to establish one or more quality indicators, the one or more quality indicators indicating a quality of one or more communication links between the first communication device and one or more second communication devices, the first communication device comprising:

a plurality of antenna elements; and a signal modifier operable to:

determine a modification according to the one or more quality indicators, the modification describing at least one adjustment of one or more modulation features of a plurality of modulation features, wherein said plurality of modulations features include at least one feature selected from the group consisting of power ratio and phase difference;

receive a time boundary indicator indicating a boundary of a time period;

modulate at least a first of a plurality of signals relative to a second of said plurality of signals in accordance with the modification and in response to the time boundary indicator, each of the plurality of signals associated with an antenna element of the plurality antenna elements; and send the plurality of signals to the respective plurality of antenna elements to yield a transmitted signal.

7. The system of claim 6, the signal modifier operable to receive a time boundary indicator indicating a boundary of a time period by receiving the time boundary indicator from a baseband system.

8. The system of claim 6, the signal modifier operable to receive a time boundary indicator indicating a boundary of a time period by receiving a time boundary signal comprising the time boundary indicator.

9. The system of claim 6, wherein the time period further comprises a power control group.

10. The system of claim 6, the signal modifier operable to modulate at least a first of a plurality of signals relative to a second of said plurality of signals in accordance with the modification and in response to the time boundary indicator to synchronize the modulation of the signal with one or more next quality indicators, the one or more next quality indicators indicating the quality of the one or more communication links in response to the modulation.

11. A system for communicating a signal, comprising:

means for establishing one or more quality indicators at a first communication device, the first communication device comprising a plurality of antenna elements, the one or more quality indicators indicating a quality of one or more communication links between the first communication device and one or more second communication devices;

means for determining a modification according to the one or more quality indicators, the modification describing at least one adjustment of one or more modulation features of a plurality of modulation features, wherein said plurality of modulations features include at least one feature selected from the group consisting of power ratio and phase difference;

means for receiving a time boundary indicator indicating a boundary of a time period;

means for modulating at least a first of a plurality of signals relative to a second of said plurality of signals in accordance with the modification and in response to the time boundary indicator, each of the plurality of signals associated with an antenna element of the plurality antenna elements; and means for sending the plurality of signals from the respective plurality of antenna elements to yield a transmitted signal.

12. A method for communicating a signal, comprising:

establishing one or more quality indicators at a first communication device, the first communication device comprising a plurality of antenna elements, the one or more quality indicators indicating a quality of one or more communication links between the first communication device and one or more second communication devices;

determining a modification according to the one or more quality indicators, the modification describing at least one adjustment of one or more modulation features of a plurality of modulation features, wherein said plurality of modulations features include at least one feature selected from the group consisting of power ratio and phase difference;

receiving a time boundary indicator indicating a boundary of a time period, the time boundary indicator received by receiving a time boundary signal comprising the time boundary indicator from a baseband system;

modulating at least a first of a plurality of signals relative to a second of said plurality of signals in accordance with the modification and in response to the time boundary indicator, each of the plurality of signals associated with an antenna element of the plurality antenna elements, at least the first of said signals modulated relative to the second of said plurality of signals in response to the time boundary indicator in order to synchronize the modulation of the signal with one or more next quality indicators, the one or more next quality indicators indicating the quality of the one or more communication links in response to the modulation; and sending the plurality of signals from the respective plurality of antenna elements to yield a transmitted signal.

* * * * *